United States Patent [19]
Klim

[11] Patent Number: 5,983,339
[45] Date of Patent: Nov. 9, 1999

[54] POWER DOWN SYSTEM AND METHOD FOR PIPELINED LOGIC FUNCTIONS

[75] Inventor: Peter Juergen Klim, Austin, Tex.

[73] Assignee: International Business Machines Corporation, Armonk, N.Y.

[21] Appl. No.: 08/517,043

[22] Filed: Aug. 21, 1995

[51] Int. Cl.[6] ...................................................... G06F 9/38
[52] U.S. Cl. .............................. 712/200; 712/1; 713/323; 713/601
[58] Field of Search ..................................... 395/800, 376, 395/800.01, 750.04, 560, 750.03, 182.19, 185.02, 377

[56] References Cited

U.S. PATENT DOCUMENTS

| | | | |
|---|---|---|---|
| 4,317,180 | 2/1982 | Lies | 364/707 |
| 4,685,058 | 8/1987 | Lee et al. | 395/598 |
| 4,736,119 | 4/1988 | Chen et al. | 327/143 |
| 4,956,618 | 9/1990 | Ulmer | 331/116 FE |
| 5,025,387 | 6/1991 | Frane | 364/493 |
| 5,167,024 | 11/1992 | Smith et al. | 395/750 |
| 5,218,704 | 6/1993 | Watts, Jr. et al. | 395/750 |
| 5,377,205 | 12/1994 | Shi | 371/36 |
| 5,418,969 | 5/1995 | Matsuzaki et al. | 395/750 |
| 5,457,781 | 10/1995 | Millar et al. | 395/200.78 |
| 5,551,017 | 8/1996 | Baxter | 395/552 |
| 5,586,332 | 12/1996 | Jain et al. | 395/750.04 |
| 5,603,012 | 2/1997 | Sotheran | 395/500 |
| 5,708,374 | 1/1998 | Durham et al. | 326/93 |
| 5,732,233 | 3/1998 | Klim et al. | 395/376 |

Primary Examiner—Meng-Ai T. An
Assistant Examiner—Walter D. Davis, Jr.
Attorney, Agent, or Firm—Kelly K. Kordzik; Winstead Sechrest & Minick P.C.; Anthony V. S. England

[57] ABSTRACT

Logic circuitry added to each stage of a pipeline of staged logic circuitry sequentially removes a clock signal from each stage when data incoming to the pipeline is invalid, or not to be processed for any practical use. The same logic circuitry is also useful for reapplying the clock signal to the successive stages of the pipeline when valid data is to be processed by the pipeline.

17 Claims, 6 Drawing Sheets

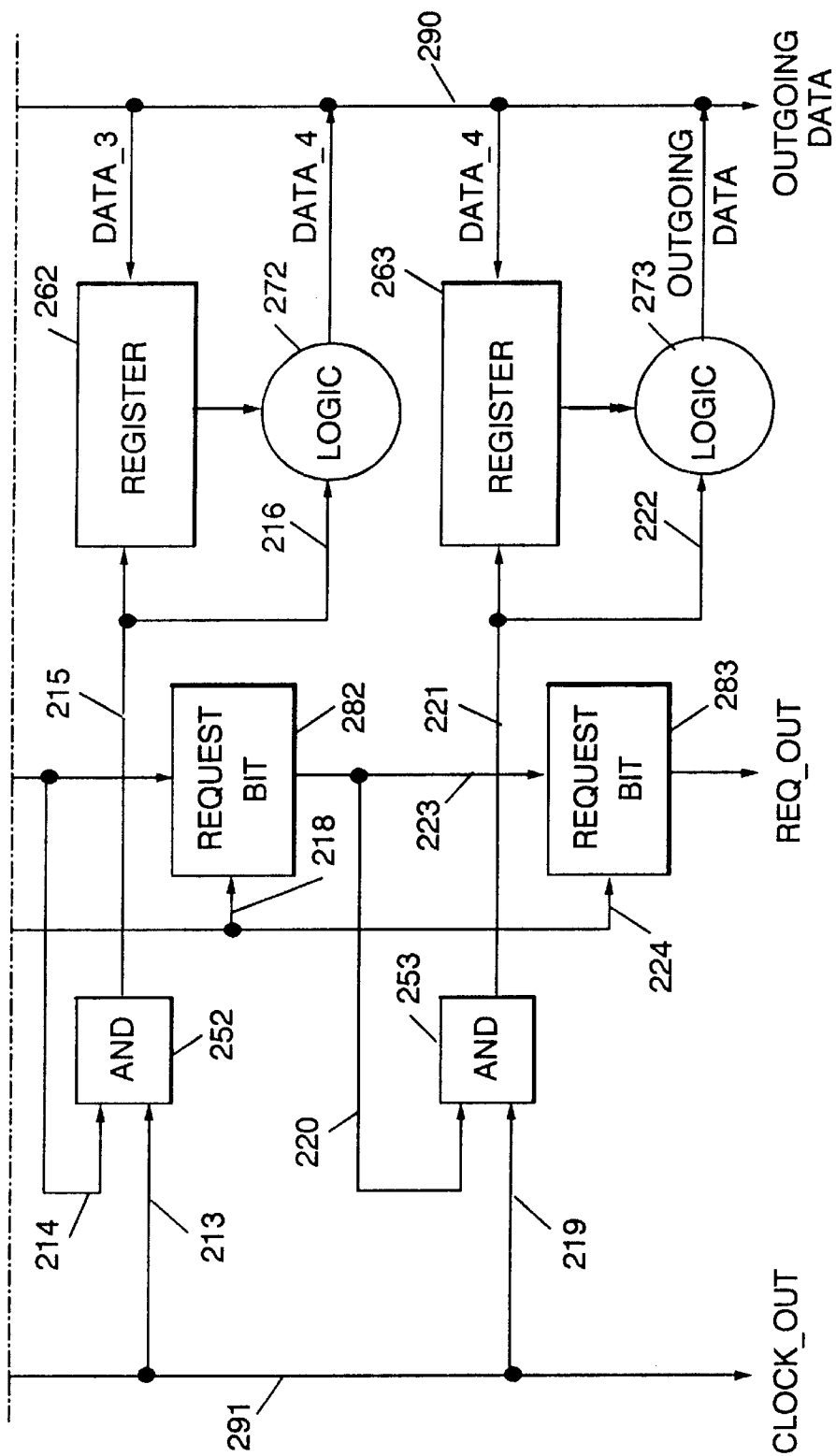

POWER DOWN SYSTEM AND METHOD FOR PIPELINED LOGIC FUNCTIONS

TECHNICAL BACKGROUND OF THE INVENTION

The present invention relates generally to a data processing system, and more particularly to a system and method of regulating the flow of the system clock signal to the various stages of pipelined logic circuits so that only the active stages are receiving the signal.

BACKGROUND OF THE INVENTION

The system clock is the electronic device in a computer system designed to generate pulses of current at precisely timed intervals. These pulses synchronize the various circuits and components of the system. Logic chips may have their own, on-board clocks, or they may receive pulses from external sources. Many circuits are designed specifically to function in time with the clock pulses.

The technique of pipelining is one of the most common features of parallel processing (i.e. processing that involves several tasks being performed simultaneously), and is used in many modern microprocessors. Pipelining involves taking a repeatedly performed function and dividing it up into several subfunctions. Characteristics of functions suitable for pipelined processing include:

The basic function can be broken down into an equivalent set of subfunctions which are evaluated sequentially;

Other than the exchange of inputs and outputs, there are no interrelationships between subfunctions.

Hardware can be developed to perform each subfunction.

The subfunctions are called stages of the pipeline. Each stage requires a set of logic circuits to perform the required subfunction of that stage. For example, the required operation may be to fetch an instruction from some memory location. Additionally, since the logic that actually performs the operation has no memory, every stage requires a register in which to store the incoming binary information. A register is simply a set of circuits that are capable of "remembering" their prior state. The individual memory elements of a register are digital flip-flops. Thus, a register may contain 64 flip-flops, and would thus be capable of "storing" 64 bits of information. In traditional pipeline architecture, each new pulse of the system clock is sent to all registers and operational logic circuits in all stages of the pipeline. As a result, all circuits involved in the pipeline consume power, regardless of whether they are performing a useful function at the time.

Turning off the clock pulse to these idle circuits would greatly reduce the flow of current and thus reduce the amount of heat generated within the pipeline. This is significant because cooling has become a major challenge in high performance logic chips. Excess heat can seriously impair system performance. However, simultaneously reactivating the clock for all of these circuits once they are needed again has its own hazards. If the number of circuits is large enough, such reactivation would result in a power supply fluctuation that could cause a chip to malfunction. Therefore, a technique is needed for processing data through a logic pipeline in such a manner as to gradually disable/enable the clock signal to all pipeline stages as they become idle/active.

SUMMARY OF THE INVENTION

It is an objective of the present invention to provide a system and method of minimizing the use of the clock signal in pipelined logic circuits. In an attainment of the above objective, the present invention implements a pipelined logic design wherein current from the system clock is disabled to all idle stages of the pipeline. The disabling process occurs in the order in which the stages become idle. This is accomplished by setting up the pipeline in such a manner as to inhibit the system clock pulse to any stage of the logic pipeline wherein the previous stage has not received usable data on the previous cycle. It should be noted that "data" is being used in its generic sense, referring to any transmitted signal. The signals travelling through the pipeline can signify any binary information, including memory addresses and instructions, as well as numerical values that require arithmetic manipulation.

This setup utilizes an additional logical AND gate and one additional flip-flop in parallel with each stage of the pipeline. The additional flip-flop may be one belonging to the register of that stage. The status of this flip-flop will be a "1" when there is valid data in the previous stage of the pipeline and a "0" when there is no valid data. The status of the data passing through the pipeline is thus reflected in this bit. This bit, also called the request bit, gets passed down from one stage of the pipeline to the next. The clock pulse for each stage cannot travel to the circuits in the stage (other than the flip-flop representing the request bit) unless the request bit passed from the previous stage is a "1." This will greatly reduce the amount of current flow to the pipeline, and thus reduce the amount of heat generated in the chip.

This invention enables the logic pipeline to transition from an idle state to an active state by reapplying the clock signal in stages upon receiving valid data. The presence of valid data is signalled by the request line going from a low to a high state. When this occurs, the clock signal is allowed through the AND gate at the first stage, and is received by the first register. In response to the receipt of the clock pulse, the first register of the pipeline begins clocking data. The extra flip-flop of that stage then changes state to reflect the high state of the request line. In other words, the request bit of the first stage becomes a logical "1."

On the following clock cycles, the request bit is passed down one stage at a time. The clock signal is reapplied to each register as the respective stages receive a request bit of "1." Thus, the clock pulse is gradually reapplied to the pipeline as valid data moves through it. This stage by stage approach to reapplying the clock pulse helps prevent power fluctuations that may cause the chip to malfunction.

The foregoing has outlined rather broadly the features and technical advantages of the present invention so that the detailed description of the invention that follows may be better understood. Additional features and advantages of the invention which form the subject of the claims of the invention will be described hereinafter.

BRIEF DESCRIPTION OF THE DRAWING

For a more complete understanding of the present invention, and the advantages thereof, reference is now made to the following descriptions taken in conjunction with the accompanying drawings, in which:

FIGS. 2A, 2B illustrates a block diagram of logic circuits configured for pipeline processing in accordance with the present invention;

DETAILED DESCRIPTION OF A PREFERRED EMBODIMENT OF THE INVENTION

To more clearly describe these features of the present invention, discussion of other conventional features is omitted as being apparent to those skilled in the art. It is assumed that those skilled in the art are familiar with basic digital logic circuits and data bus operation. It is also assumed that those skilled in the art can read and understand signal timing diagrams.

Figure 1:
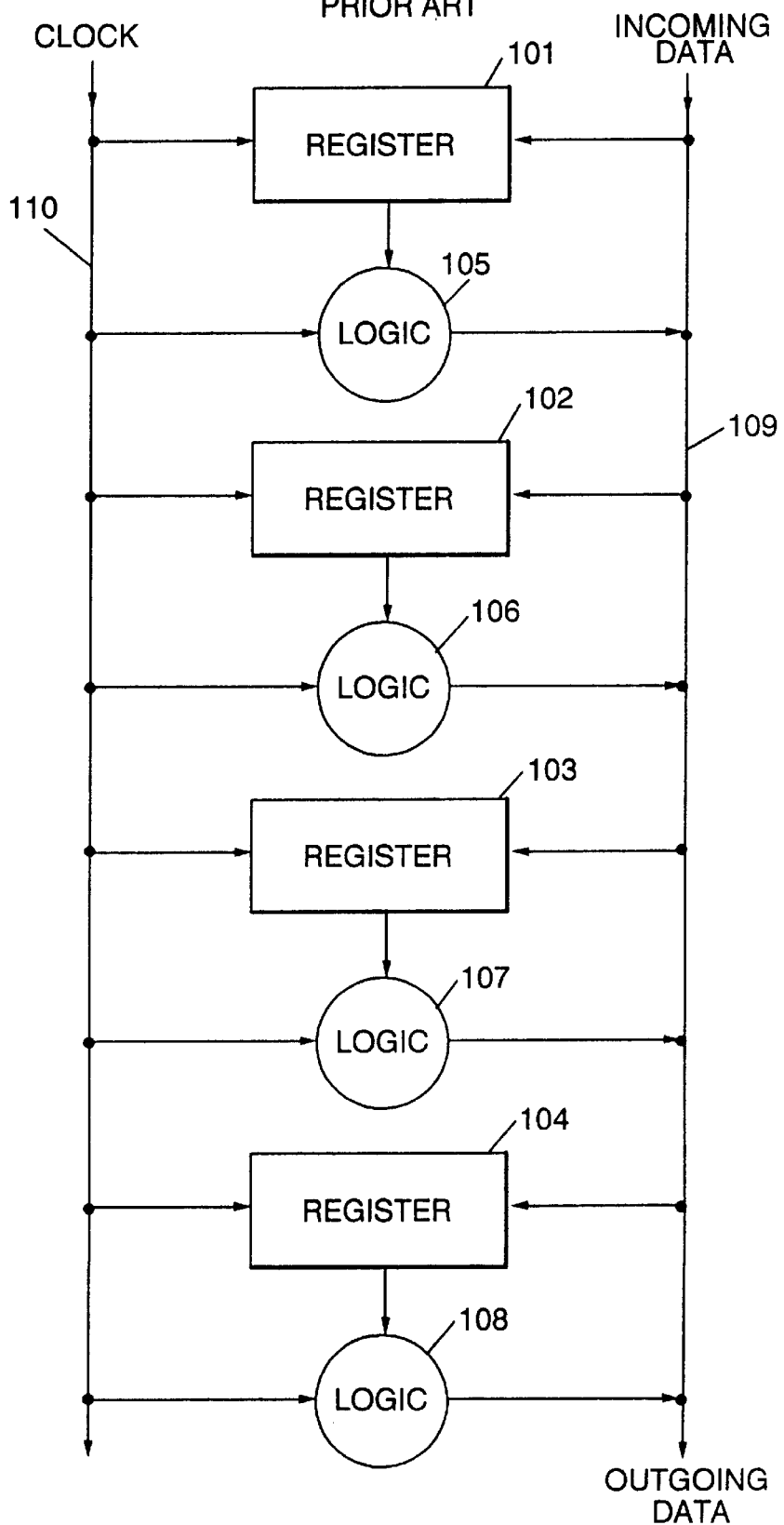
FIG. 1 illustrates a block diagram of logic circuits configured for pipeline processing in accordance with the prior art.

Prior art methods of minimizing the clock pulse involve shutting off the clock signal to entire components or processors and require reactivating the clock pulse to all stages of the pipeline simultaneously. Referring to FIG. 1, there is illustrated a series of logic circuits configured for pipelined processing in accordance with the prior art. This particular pipeline segment has four stages. The number of possible stages in the pipeline is limitless, but for the sake of simplicity, only four are shown here. Registers 101–104 are linked together by bus 109. With each register, there is a logic assembly, labeled 105–108, also coupled to bus 109. Each register and associated logic assembly represents a stage in the pipeline, i.e. register 101 and logic 105 together represent stage 1 of the pipeline. The data on the bus can originate from anywhere in a computer system. Likewise, data exiting the pipeline can travel to any part of the system. The clock signal from clock line 110 is distributed directly to all registers and logic elements of the pipeline. Every flip-flop in registers 101–104 receives the clock signal, regardless of whether there is binary data for which pipeline processing is required. Data which needs to be processed and used by the system is hereinafter referred to as "valid data."

In FIG. 1, even invalid data being transmitted on bus 109 will be clocked into registers 101–104 and processed by logic elements 105–108. This represents an unnecessary use of current and expenditure of power, since the data will perform no useful function and is not required by any element of the system. It also creates unwanted heat in the chip, which impedes performance.

In dynamic logic elements, receipt of the clock pulse triggers reset circuits, which are complimentary circuits designed to force the primary logic circuits to their original state. Thus, if logic 105–108 are dynamic, they will evaluate and reset on every clock cycle, resulting in further unnecessary use of power and dissipation of heat. For a background discussion of dynamic logic circuitry, please refer to U.S. patent application Ser. No. 08/450,056 and Ser. No. 08/461,961 which are hereby incorporated by reference herein.

Figure 2A:
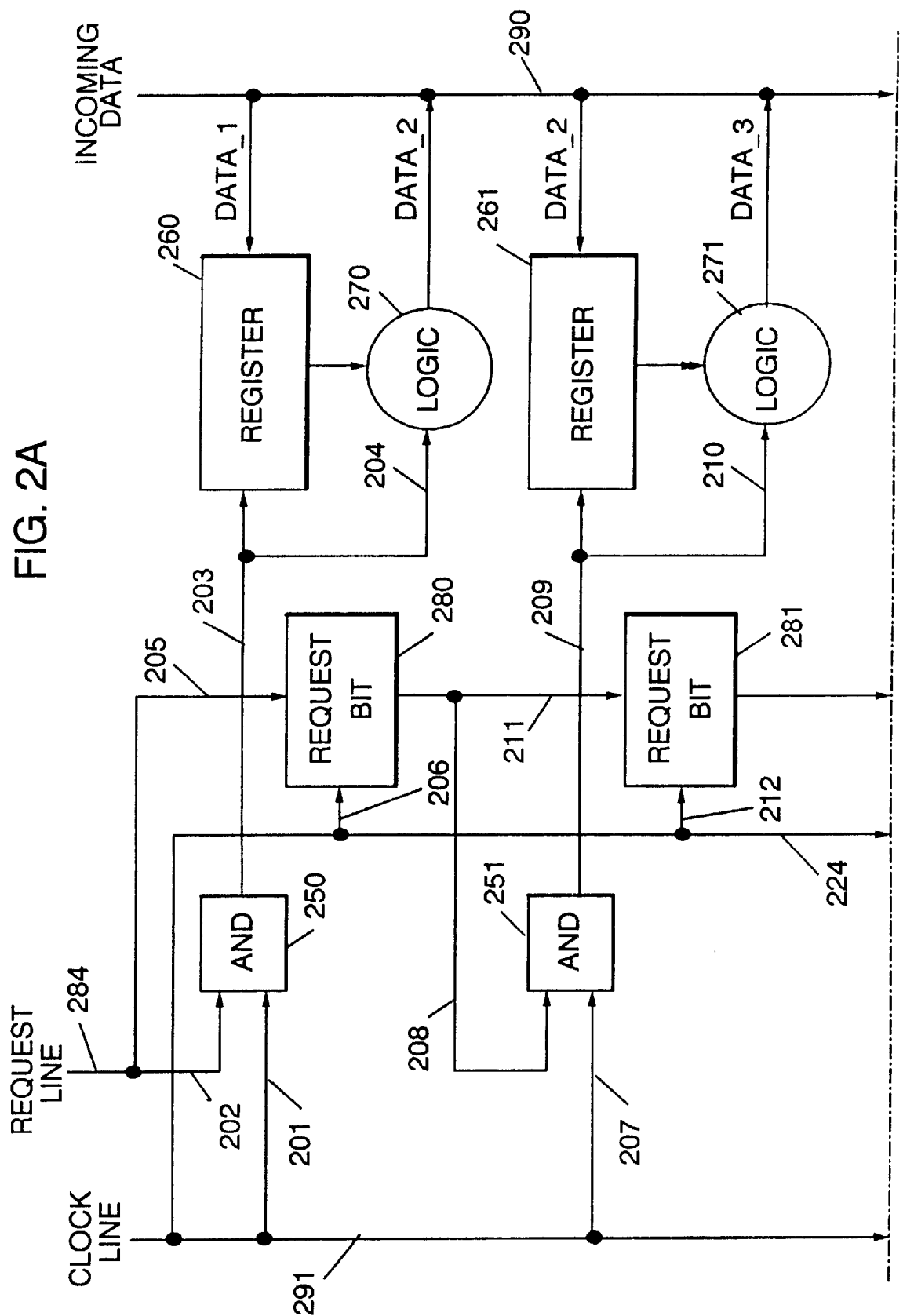

FIGS. 2A, 2B depict a series of logic circuits configured for pipeline processing in accordance with the present invention. The pipeline is arranged in stages, registers 260–263 being coupled with logic elements 270–273, respectively, said registers and logic elements being coupled to bus 290. As with the prior art, each stage includes a register and corresponding logic element. However, this method utilizes one extra flip-flop in parallel with each stage in order to represent a request signal. In FIG. 2, these flip-flops are labeled 280–283. They are coupled with clock line 291 and Request Line 284. Flip-flops contained within the registers may also be utilized to represent the Request signal generated on the Request Line.

Request Line 284 is set to a binary '1' if the Incoming data is valid, and is set at '0' otherwise. The signal responsible for the state of Request Line 284 originates at the same location as the bus data. Thus, a Request signal could come from any part of the system—a previous pipeline stage, another pipeline, a decoder, etc.—and will accompany all valid data to be processed by the pipeline.

Figure 5:
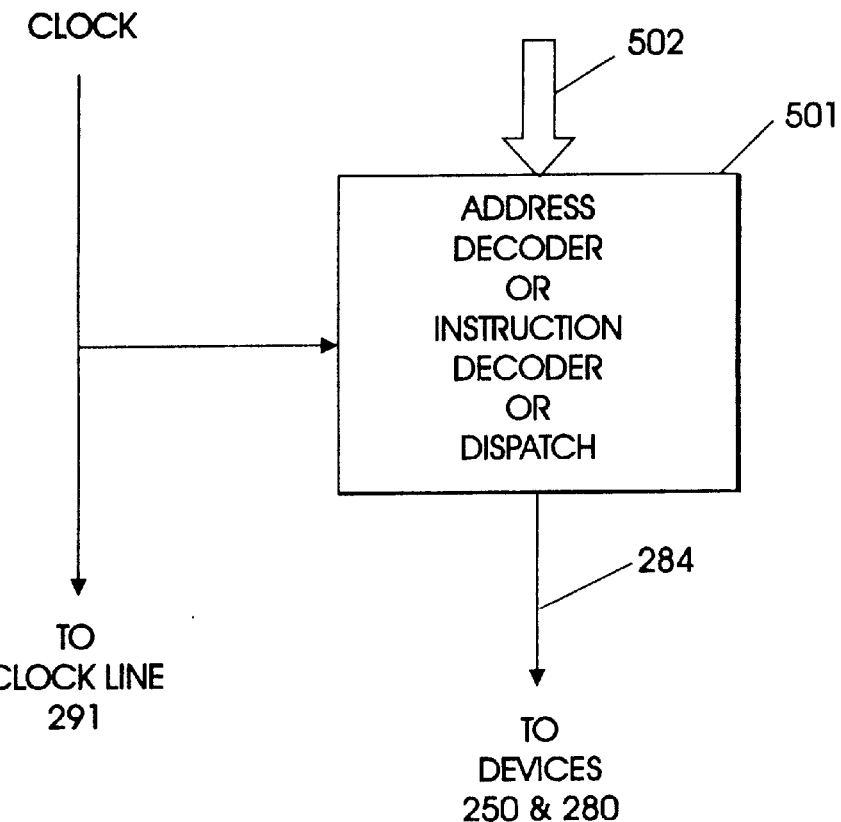
FIG. 5 illustrates possible means for producing the request signal in FIG. 2.
Figure 5:
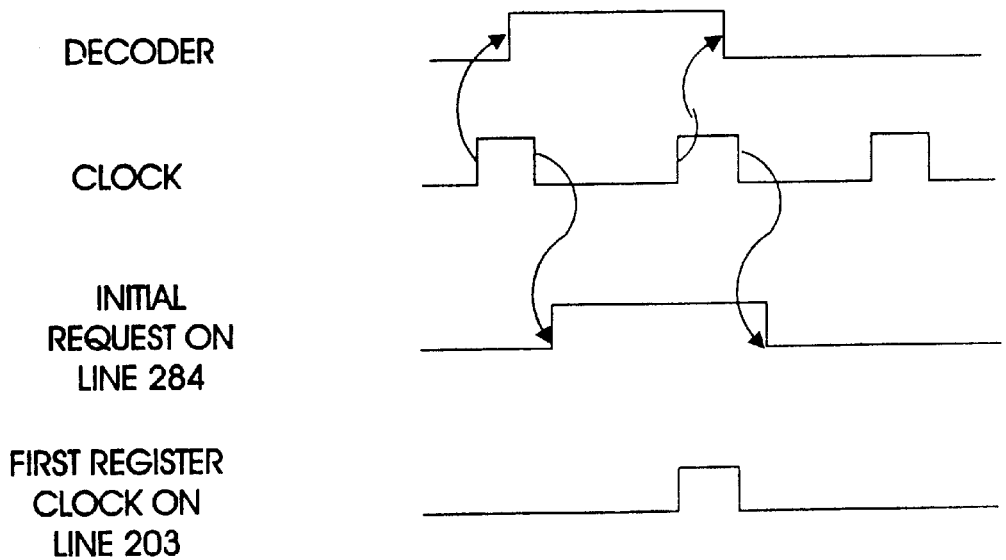

The Request signal may ultimately be produced by an address decoder, or instruction decoder, or dispatch unit, such as within a floating point multiplier unit in a processor. Referring to FIG. 5, as an example, an instruction may be received on bus 502 into instruction decoder 501. Instruction decoder 501 decodes the particular operation desired and will send the Request signal on line 284, as illustrated in FIG. 2. This Request signal will only be sent to those pipelines that are to perform operations in accordance with the decoded instruction. Those pipelines not utilized for any operations will not receive a Request signal from circuit 501. FIG. 5 also illustrates a timing diagram illustrating the operation of decoder 501. This timing diagram illustrates how circuit 501 is dependent upon the rising edges of the Clock signal, how the initial Request signal is produced and placed on line 284, and how AND circuit 250 produces the Clock signal on line 203 to be sent to register 260. Note that the initial Request signal is of a predetermined length sufficient to begin the process of evaluating the incoming data on line 290 by the pipeline illustrated in FIG. 2.

The present invention also utilizes a logical AND gate at each stage of the pipeline. Each AND gate has two inputs: a request line and a clock line. These gates are labeled 250–253 in FIG. 2. Gate 250 is in parallel with the first stage, and is coupled with input line 202, which is coupled to Request Line 284. Gates 251, 252, and 253 do not receive signals directly from Request Line 284. Instead, they are coupled to flip-flops 281, 282, and 283, receiving Request bits as they are passed down. Gates 250–253 are also coupled to Clock Line 291 and thus receive every system clock pulse. The AND gates allow a rising clock edge (a logical '1') to proceed to their respective registers and logic elements only if a logical '1' is simultaneously transmitted over its request line. If a request line is a logical '0,' the associated register and logic function will never receive a logical '1' as their clock inputs.

Figure 3:
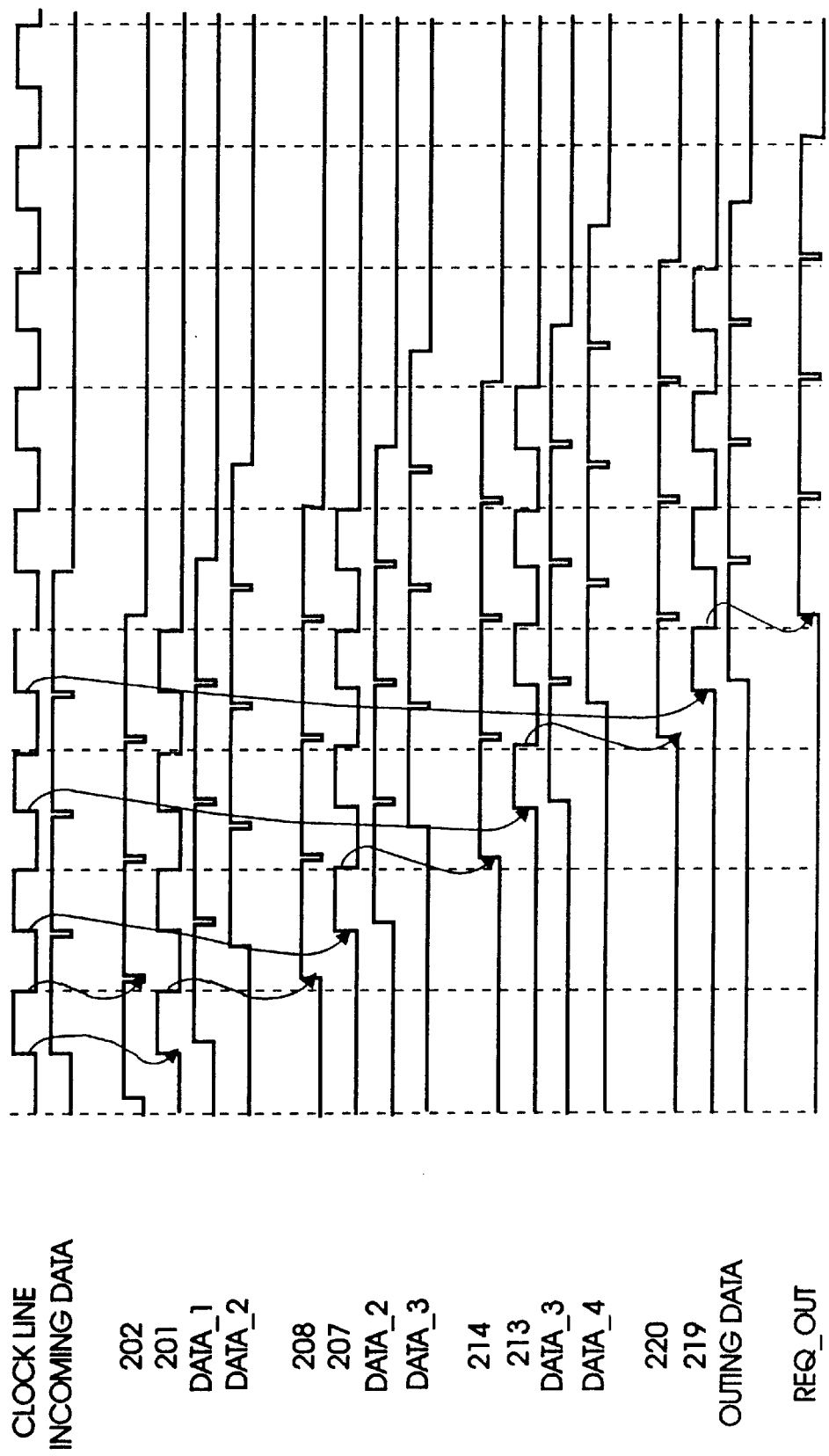
FIG. 3 illustrates a timing diagram of a pipeline structure set up in accordance with the present invention.

To illustrate this method in operation, refer to FIG. 2 and to the timing diagram of FIG. 3. The following initial assumptions are made: Request Line 284 is low, indicating a lack of valid data arriving on bus 290. Flip-flops 280–283 all read logical '0's, indicating that there is no valid data at any stage of the pipeline. Because the request bit is '0' at all stages of the pipeline, the pulse from the system clock across lines 201, 207, 213, and 219 is not being passed through AND gates 250–253. Thus, there is no clock input to registers 260–263 and logic elements 270–273. All registers and logic functions are in their initial state and will remain so until the request signal goes high. Only gates 250–253 and flip-flops 280–283 receive all of the clock pulses.

When valid data becomes available, Request Line 284 is set to a logical '1' on the falling edge of the clock signal, and this is transmitted to gate 250 via line 202. The pipeline will now begin a power-up phase. When the next rising edge arrives over clock line 291, line 201 goes high, and because both inputs to AND gate 250 now evaluate to '1,' the clock pulse is now allowed to reach register 260 and logic 270. Upon receiving the rising edge of the clock pulse, register 260 (consisting of clocked flip-flops linked in parallel) clocks in Data_1 which arrives on bus 290. Logic 270 now evaluates Data_1, and the result of that evaluation becomes Data_2, which becomes a valid input for register 261. As clock line 291 goes to a low state (falling edge), flip-flop 280 receives that clock state via line 206. Flip-flop 280 is then latched into the state corresponding to the request line at 205, which is still a logical '1.' The condition of flip-flop 280 is then transmitted along line 208 to become an input to AND gate 251. On the second rising edge of the clock pulse, the process is repeated at stage 1, resulting in a second word of data being clocked in by register 260 and evaluated by logic 270. At stage 2, since line 208 is now high, the second rising edge arriving at AND gate 251 via line 207 causes the output of the gate to be a logical '1.' As in stage 1, the clock pulse passes through AND gate 251, over lines 209–210, and into register 261 and logic 271. Register 261 now clocks in Data_2. The incoming Data_2 is evaluated by logic 271, and the resulting Data_3 now becomes a valid input for register 262. When flip-flop 281 receives the falling edge of the clock via line 212, it becomes latched into the state corresponding to flip-flop 280 as received over line 211. The value of flip-flop 281 is now sent to AND gate 252 (via line 214). On the next rising edge of the clock, the clock pulse sent to AND gate 252 (via line 213) causes the gate to evaluate to a logical '1,' and the clock pulse is thereby transmitted to register 262 and logic 272 via lines 215–216. The whole process is repeated on every clock cycle at each stage until each of the four registers contains a valid data word. The pipeline is now full. As FIG. 3 illustrates, the clock signal is sent to registers 260–263 only as valid data is received.

After the last word of valid data is clocked into register 260, the request line drops to a low state on the next falling edge of the clock. The pipeline will now begin a power-down phase. Flip-flop 280 receives a logical '0' via line 205. On the next rising edge of the clock, line 201 at AND gate 250 goes high, but since line 202 (from the request line) is low, the clock pulse does not get transmitted through AND gate 250. Thus, 203 and 204 remain low and neither register 260 nor logic 270 receives the rising edge of the most recent clock pulse. Only flip-flop 280 receives the rising edge (via 206). Thus, no data is clocked into register 260, and logic 270 performs no evaluation. Stages 2 through 4 still function as before. When flip-flop 280 receives the next falling edge of the clock, it latches the value of the request line received via line 205, which is a logical '0' in this case. This low state gets sent to gate 251 via line 208, and the process is repeated stage after stage, until none of the data processing elements is receiving clock pulses. The pipeline is now empty. The clock is only being distributed to AND gates 250–253 and flip-flops 280–283. As with the power-up phase, powering down the stages of the pipeline as they become idle avoids the power glitches that would occur if they were all powered down simultaneously.

Figure 4:
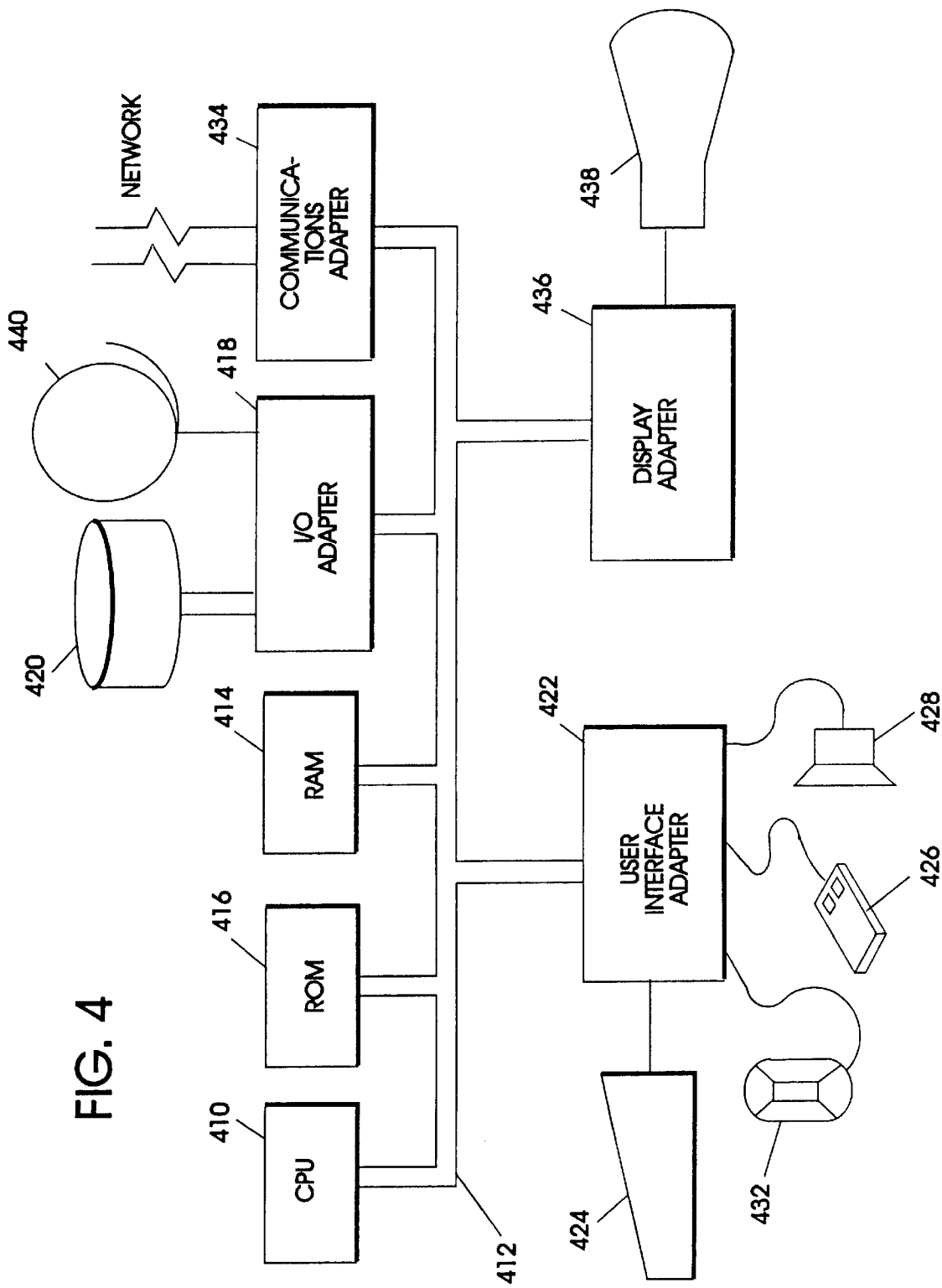
FIG. 4 illustrates a data processing system configured in accordance with the present invention.

A representative hardware environment for practicing the present invention is depicted in FIG. 4, which illustrates a typical hardware configuration of a workstation in accordance with the subject invention having central processing unit 410, such as a conventional microprocessor, and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method for processing information in stages of a pipeline of logic components, said method comprising the steps of:

receiving a request signal at a first stage in said pipeline;

receiving a first clock signal at the first stage;

receiving and processing data in said first stage when said request signal indicates that said received data is valid; and selectively applying said first clock signal to said first stage only when said request signal indicates first data of said received data is valid.

2. The method as recited in claim 1, further comprising the steps of:

transferring said request signal from said first stage to a second stage in said pipeline; and processing data received from said first stage in said second stage in response to receipt of said request signal in said second stage.

3. The method as recited in claim 2, wherein said first and second stages are coupled to a data bus, wherein said step of receiving and processing data in said first stage when said request signal indicates that said received data is valid further comprises the steps of:

receiving first data from said data bus when said request signal indicates that said first data is valid;

storing said first data in said first stage; and performing a logical function on said first data to produce second data.

4. The method as recited in claim 3, wherein said step of processing data received from said first stage in said second stage in response to receipt of said request signal in said second stage further comprises the steps of:

transmitting said second data onto said data bus;

receiving said second data from said data bus in response to receipt of said request signal in said second stage;

storing said second data in said second stage; and performing a logical function on said second data to produce third data.

5. The method as recited in claim 2, wherein said step of processing data received from said first stage in said second stage in response to receipt of said request signal in said second stage further comprises the steps of:

receiving a second clock signal; and applying said second clock signal to said second stage in response to receipt of said request signal from said first stage into said second stage.

6. The method as recited in claim 1, wherein said steps of receiving and processing data in said first stage are not performed when said request signal indicates that said received data is invalid.

7. The method as recited in claim 1, further comprising the steps of:

removing said clock signal from said first stage when said request signal indicates that said received data is invalid; and transferring said request signal indicating that said received data is invalid to a subsequent stage coupled to said first stage.

8. The method as recited in claim 7, further comprising the step of:

clocking said request signal indicating that said received data is invalid down said pipeline sequentially through subsequent stages of said pipeline, wherein said clocking step results in removal of clock pulses from said subsequent stages in a sequential manner.

9. A system for processing information in stages of a pipeline of logic components, said system comprising:

means for receiving a request signal at a first stage in said pipeline; and means for receiving and processing data in said first stage when said request signal indicates that said received data is valid, wherein said means for receiving and processing comprises:
    means for receiving a first clock pulse; and
    a first logic circuit, coupled to said means for receiving said first clock pulse, for applying said clock pulse to said first register and a second logic circuit only when said request signal indicates that a first data of said received data is valid.

10. The system as recited in claim 9, further comprising:

means for transferring said request signal from said first stage to a second stage in said pipeline; and means for processing data received from said first stage in said second stage in response to receipt of said request signal in said second stage.

11. The system as recited in claim 10, wherein said first and second stages are coupled to a data bus, wherein said comprises:

first register receives said first data from said data bus when said request signal indicates that said first data is valid, said first register storing said first data; and wherein said second logic circuit performs a logical function on said first data to produce second data.

12. The system as recited in claim 11, wherein said means for processing data received from said first stage in said second stage in response to receipt of said request signal in said second stage further comprises:

means for transmitting said second data onto said data bus;

a second register for receiving said second data from said data bus in response to receipt of said request signal in said second stage, said second register storing said second data in said second stage; and a third logic circuit for performing a logical function on said second data to produce third data.

13. The system as recited in claim 12, wherein said means for processing data received from said first stage in said second stage in response to receipt of said request signal in said second stage further comprises:

receiving a second clock pulse; and applying said second clock pulse to said second stage in response to receipt of said request signal from said first stage into said second stage.

14. The system as recited in claim 13, wherein said applying means is an AND circuit.

15. The system as recited in claim 10, wherein said transferring means further comprises:

a flip-flop having a first input for receiving said request signal from a previous stage in said pipeline, a second input for receiving a clock signal, and an output means for transmitting said request signal to said second stage in response to said clock signal.

16. A data processing system including a processor coupled via a bus to a memory device, a storage device, an input device and an output device, wherein said processor includes pipelined logic circuitry of two or more stages coupled to a data bus, said system comprising:

means for receiving a first clock signal and a request signal;

first logic circuitry coupled to said data bus;

means, coupled to said means for receiving said first clock signal and said request signal, for applying said first clock signal to said first logic circuitry when said request signal indicates that first data residing on said data bus is valid data;

means, responsive to receipt by said first logic circuitry of said first clock signal, for inputting said first data into said first logic circuitry for processing by said first logic circuitry in order to produce second data;

means for outputting said second data from said first logic circuitry to said data bus;

means for receiving a second clock signal;

means for transferring said request signal to said means for receiving said second clock signal;

second logic circuitry coupled to said data bus;

means, coupled to said means for receiving said second clock signal, for applying said second clock signal to said second logic circuitry;

means, responsive to receipt by said second logic circuitry of said second clock signal, for inputting said second data into said second logic circuitry for processing by said second logic circuitry in order to produce third data;

means for outputting said third data from said second logic circuitry to said data bus.

17. The system as recited in claim 16, wherein said means for receiving said first clock signal and said means for receiving said second clock signal are coupled to a clock bus.

* * * * *